W. W. CURTIS.
PLOWING AND PULVERIZING MACHINE.
APPLICATION FILED DEC. 19, 1913.
1,122,368.
Patented Dec. 29, 1914.
4 SHEETS—SHEET 1.
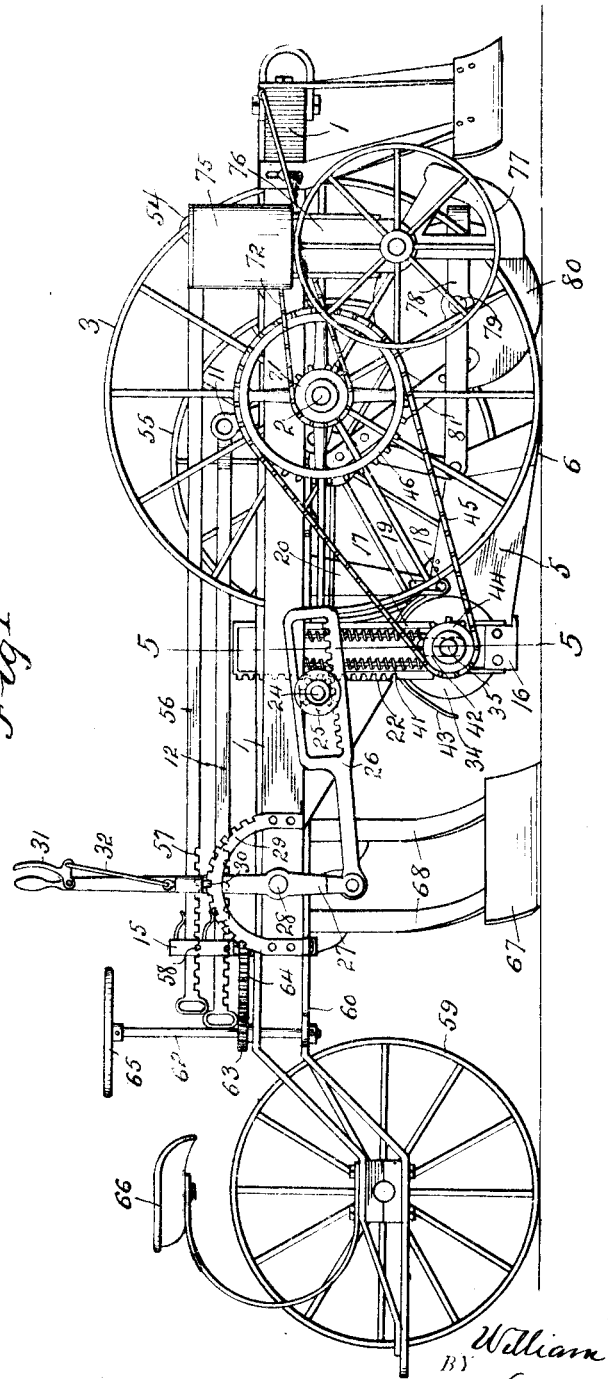
WITNESSES:
INVENTOR.
William W. Curtis
BY Warren D. House
His ATTORNEY.

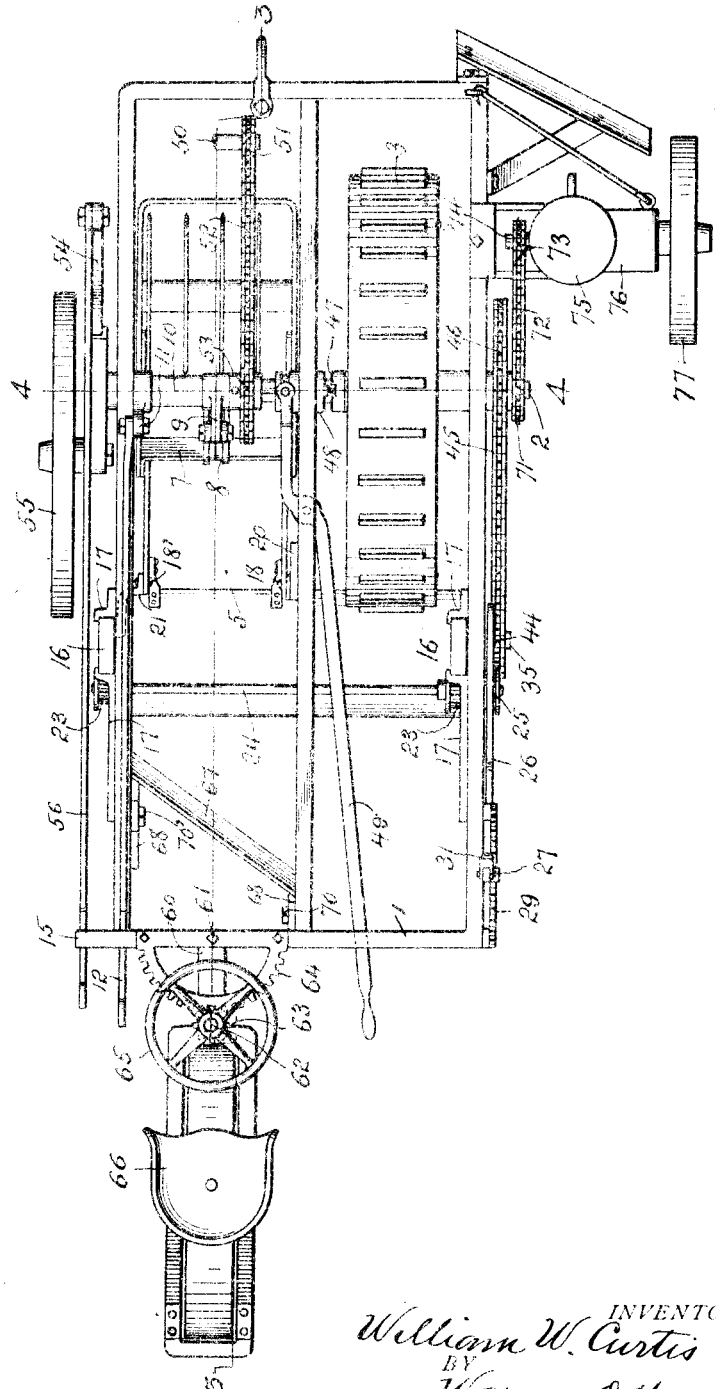

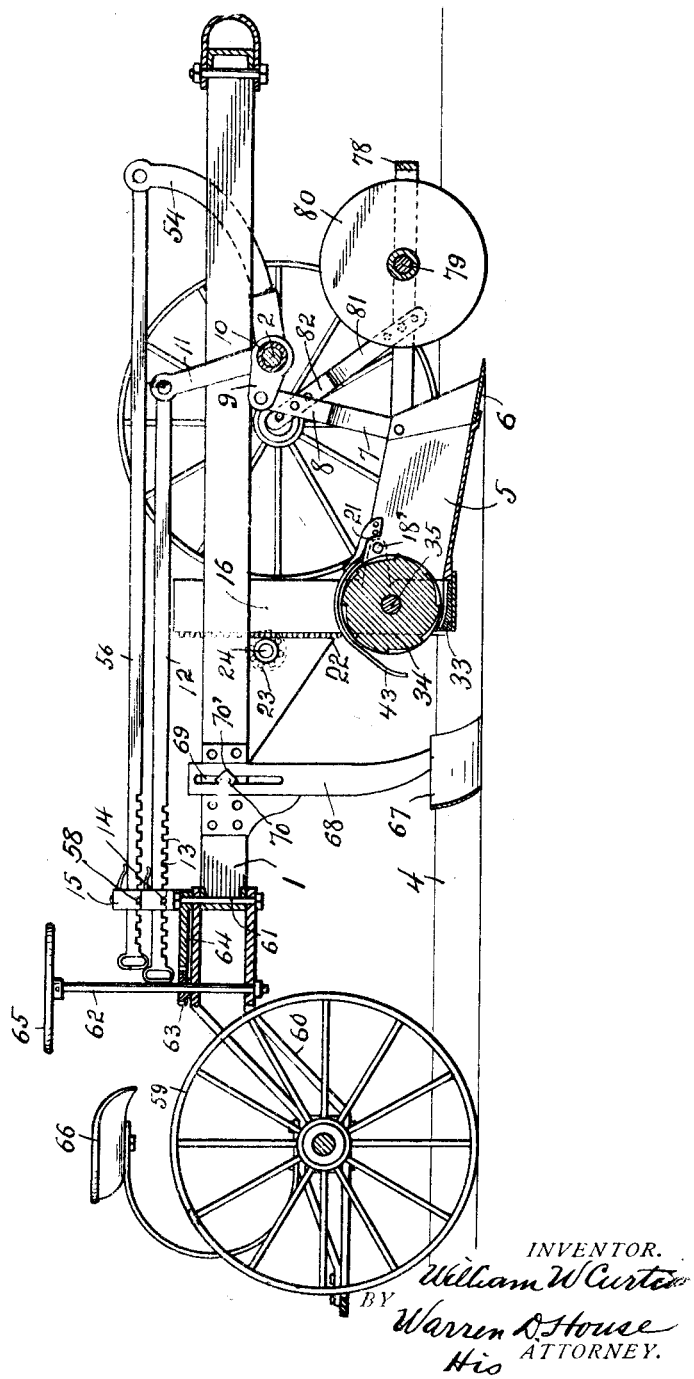

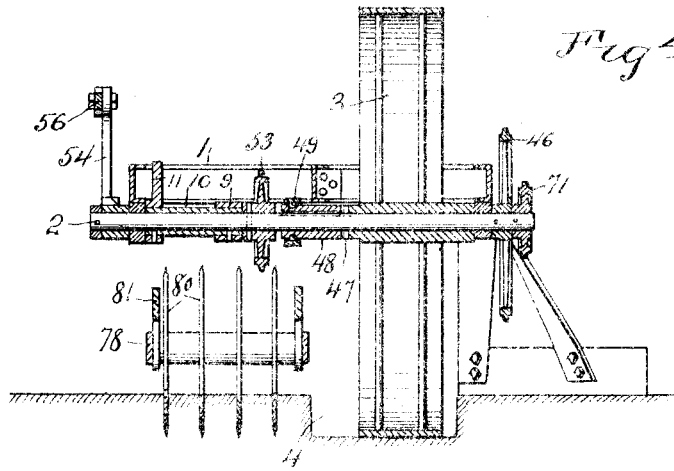
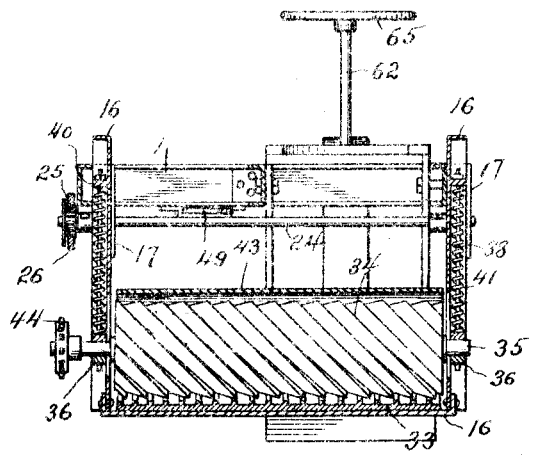
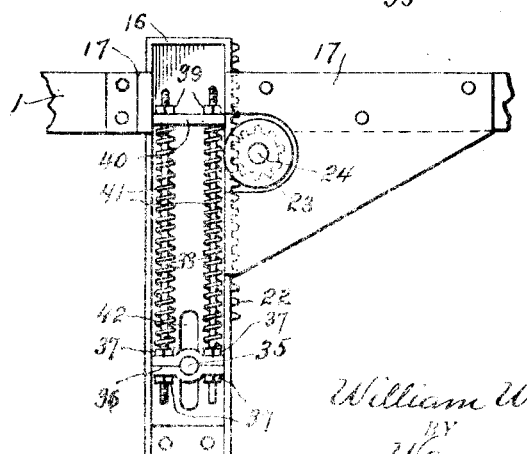

UNITED STATES PATENT OFFICE.

WILLIAM W. CURTIS, OF KANSAS CITY, MISSOURI, ASSIGNOR OF ONE-HALF TO EMSLEY CURTIS, OF INDEPENDENCE, MISSOURI.

PLOWING AND PULVERIZING MACHINE.

1,122,368.     Specification of Letters Patent.     Patented Dec. 29, 1914.

Application filed December 19, 1913. Serial No. 807,638.

*To all whom it may concern:*

Be it known that I, WILLIAM W. CURTIS, a citizen of the United States, residing at Kansas City, in the county of Jackson and State of Missouri, have invented a certain new and useful Improvement in Plowing and Pulverizing Machines, of which the following is a specification.

My invention relates to improvements in plowing and pulverizing machines.

The object of my invention is to provide a simple and efficient machine by which earth may be plowed, finely pulverized, and then deposited evenly upon the ground.

My invention is an improvement on the invention for which Letters Patent No. 1,070,423 were granted to me August 19, 1913.

The novel features of my invention are hereinafter fully described and claimed.

In the accompanying drawings which illustrate the preferred embodiment of my invention—Figure 1 is a side elevation of the machine. Fig. 2 is a plan view. Fig. 3 is a vertical section on the line 3—3 of Fig. 2. Fig. 4 is a vertical section on the line 4—4 of Fig. 2. Fig. 5 is a vertical section on the line 5—5 of Fig. 1. Fig. 6 is a fragmental, side elevation of a part of the machine, looking at the same from the left side thereof.

Similar reference characters designate similar parts in the different views.

1 designates a carrying frame having rotatably mounted thereon a horizontal transverse axle 2, Fig. 4, on which is rotatably mounted a large carrying wheel 3, which is adapted to travel in a furrow 4 which has been previously cut by a U-shaped plow 5, Fig. 3, the forward and rear ends of which are open, the bottom of the plow at its forward edge being provided with a transverse inclined cutting blade 6.

Pivoted to the sides of the plow 5, adjacent to the forward ends thereof, is a yoke 7, which has secured to it a link 8, which is pivoted at its upper end to a crank 9, secured to a sleeve 10, which is rotatable on the axle 2, and has secured to it a crank 11, to the upper end of which is pivoted the forward end of a horizontal longitudinal operating bar 12, the rear end of the lower edge of which is provided with notches 13, adapted to receive a transverse rod 14, the ends of which are secured in the vertical arms of an inverted U-shaped bracket 15, secured to the frame 1. By reciprocating the bar 12, the forward end of the plow 5 may be raised and lowered.

The rear end of the plow 5 rests upon the transverse portion of a U-shaped supplemental frame 16, which is vertically movable, the vertical arms thereof being vertically slidable in guides 17, secured to the frame 1, see Figs. 2, 5, and 6.

A horizontal pin 18, Figs. 1 and 3, extends through one side of the plow 5, and has one end vertically slidable in a vertical slot 19, provided in a vertical plate 20, secured to the frame 1. A transverse pin 18' extends through the opposite side of the plow 5, and is secured to a bracket 21, which is secured to the adjacent arm of the frame 16, Figs. 2 and 3.

The arms of the frame 16 are provided at their rear edges with racks 22, which respectively mesh with pinions 23, Figs. 1, 2 and 3, which are secured to a horizontal shaft 24, rotatably mounted in the guides 17. Secured to the shaft 24 is a pinion 25, Figs. 1 and 5, which meshes with the teeth of a rack bar 26, the rear end of which is pivoted to the lower end of a lever 27, pivoted by means of a bolt 28, to the frame 1, Fig. 1, the latter having secured to it an arcuate peripherally toothed plate 29, adapted to have engagement with a pawl 30, slidably carried on the lever 27, and adapted to be operated by a rod 32, connected to a bell crank lever 31, carried by the lever 27. By swinging the lever 27, the supplemental frame 16 may be raised and lowered. When this is done, the operating bar 12 may be lifted at its rear end from engagement with the pin 14, thereby permitting the plow 5 to move with said supplemental frame.

For pulverizing the earth discharged from the rear end of the plow 5, the following mechanism is provided: Secured upon the upper side of the transverse portion of the U-shaped frame 16, is a stationary pulverizing member 33, the upper side of which is concave and corrugated, see Figs. 3 and 5. Above and coöperating with the member 33, is a rotary cylindrical pulverizing member 34, the periphery of which is provided with spiral corrugations. The member 34 is secured to a horizontal shaft 35, which is mounted in bearings 36, each of which, as shown in Figs. 5 and 6, is held clamped between nuts 37, mounted on two vertical rods 38, which are slidably mounted in vertical holes provided in the adjacent arm of the frame 16, said rods having mounted thereon nuts 39 which rest upon a transverse shelf 40, with which each arm of the frame 16 is provided. Coiled springs 41, respectively encircle the rods 38, and bear at their upper ends against the shelves 40, their lower ends bearing against the upper nuts 37, thereby exerting a downward pressure tending to normally force the rotary member 34 against or toward the pulverizing member 33. The shaft 35 extends through vertical slots 42, provided in the arms of the frame 16. When a hard substance, such as a rock, is discharged by the plow 5, between the members 33 and 34, the springs 41 will yield and permit the rotary member 34 to rise so as to let the rock pass from between said members. A vertically movable transverse curved guard 43, may be disposed above the rotary member 34.

For rotating the shaft 35 and the member 34, the shaft 35 has secured to it a sprocket wheel 44, which engages a chain belt 45, mounted on a sprocket wheel 46, which is secured to the shaft 2.

One end of the hub of the carrying wheel 3 is provided with teeth 47, adapted to engage similar teeth, provided on the adjacent end of a clutch sleeve 48, which is longitudinally slidable on and has a feather and groove connection with the shaft 2. A lever 49, pivoted to the frame 1, has a bifurcated forward end, which engages the clutch sleeve 48, whereby the said sleeve is brought into and out of engagement with the carrying wheel 3.

If desired, the axle 2 may be rotated by an engine, not shown, carried by the frame 1, and having a driving shaft 50, Fig. 2, to which is secured a sprocket wheel 51, on which is mounted a chain belt 52, which also engages a sprocket wheel 53, which is secured to the shaft 2.

The shaft 2 has pivoted on its left end a lever 54, on one end of which is rotatably mounted a carrying wheel 55, the other end of the lever being pivotally connected to a rearwardly extending bar 56, having its rear end provided on the lower edge with notches 57, adapted to engage with a transverse pin 58, the ends of which are mounted in the arms of the U-shaped bracket 15. By lifting the rear end of the bar 56, so as to clear the pin 58, said bar may be moved lengthwise so as to swing the lever 54, and thereby raise or lower the adjacent end of the axle 2.

A steering carrying wheel 59, is mounted in a frame 60, which is pivoted at its forward end to a vertical bolt 61, mounted in the frame 1. In the frame 60, Fig. 2, is mounted a vertical rotary shaft 62, to which is secured a pinion 63, which engages the teeth of a horizontal segmental gear 64, which is secured to the frame 1. Secured to the shaft 62, is a hand wheel 65, by means of which an operator, sitting on a seat 66, carried by the frame 60, may turn the shaft 62 so as to steer the machine.

At the rear of the pulverizing mechanism is a scraper 67, which is disposed obliquely to the line of travel and is adapted to follow in the furrow 4, and force dirt, which has been dropped therein by the pulverizing mechanism, to one side of the furrow. The scraper 67 is secured to the lower ends of two upwardly extending bars 68, provided adjacent to their upper ends with vertical slots 69, in which are slidably mounted bolts 70, mounted in the frame 1, and having mounted thereon clamping nuts 70' by means of which the bars 68 may be held in the positions to which they may be adjusted.

Secured to the axle 2, is a sprocket wheel 71, to which is connected a chain belt 72, Fig. 1, which is mounted on a sprocket wheel 73, secured to the operating shaft 74, of a seed planting device 75, which is mounted on a bracket 76, secured to the frame 1, and having rotatably mounted on it a carrying wheel 77.

A horizontally U-shaped member 78, Fig. 3, has its arms pivoted to the sides of the plow 5, and supporting a horizontal bar 79, on which are rotatably mounted disk cutters 80, which are disposed and cut the dirt in front of the plow 5. A yoke 81, secured to the arms of the member 78, is provided with an extension 82, which is secured to the link 8, for supporting the member 78.

In operating my invention, the frame 1 is drawn forwardly, with the plow, pulverizing mechanism, and scraper 67, lowered to the position shown in Fig. 3. The plow 5 cuts a continuous furrow slice and discharges it directly from its rear end, between the pulverizing members 33 and 34, by means of which the earth is finely pulverized and is discharged, to a large extent, to the right of the furrow, which is cut by the plow, owing to the spiral arrangement of the peripheral corrugations of the member 34. Such earth as is discharged directly to the rear of the plow 5, is thrown by the scraper 67 clear of and to the right of the furrow, thereby leaving a clear furrow of full depth in which the large carrying wheel 3, may travel upon making the next round in plowing.

In my present invention, conveying mechanism for carrying the plowed earth upwardly and discharging it into elevated pulverizing mechanism, such as is illustrated and described in my aforesaid patent, is eliminated.

In my present invention the pulverizing mechanism is much simplified and is located in a low position, and is so disposed that the plow alone may discharge its dirt directly between the pulverizing members, thereby eliminating the complicated elevating mechanism and much reducing the cost of manufacturing the machine and the power required to operate it.

I do not limit my invention to the structure illustrated and described, as modifications, within the scope of the appended claims, may be made without departing from the spirit of my invention.

Having thus described my invention, what I claim and desire to secure by Letters Patent, is:—

1. In a plowing and pulverizing machine, a main frame, a supplemental frame vertically adjustable upon said main frame, pulverizing means carried by said supplemental frame, and plowing means carried by said main frame and arranged to cut a continuous furrow slice and discharge it directly into said pulverizing means.

2. In a plowing and pulverizing machine, a frame, a stationary member, a rotary pulverizing member movable toward and from said stationary pulverizing member, yielding means for forcing the rotary member toward the stationary member, a support carried by said frame and carrying said pulverizing members, and plowing means carried by said frame and disposed so as to discharge directly between said pulverizing members.

3. In a plowing and pulverizing machine, a carrying frame, a supplemental frame vertically adjustable thereon, means for vertically adjusting said supplemental frame, pulverizing means carried by said supplemental frame, and plowing means vertically adjustable on the carrying frame and arranged to cut a continuous furrow slice and discharge it directly into said pulverizing means.

4. In a plowing and pulverizing machine, a carrying frame, a supplemental frame vertically adjustable thereon, plowing means carried by the carrying frame and vertically adjustable thereon and arranged to cut a continuous furrow slice, a stationary pulverizing member carried by the supplemental frame, and a rotary pulverizing member carried by the supplemental frame and coöperating with the stationary pulverizing member, said pulverizing members being disposed so as to receive plowed earth from the plowing means.

5. In a plowing and pulverizing machine, a carrying frame, a support vertically adjustable thereon, pulverizing means carried by said support, and a plow carried by said support and arranged to cut a continuous furrow slice and discharge it directly into said pulverizing means.

6. In a plowing and pulverizing machine, a carrying frame, a support vertically adjustable thereon, a stationary pulverizing member carried by said support, a rotary pulverizing member carried by said support and rotating with said stationary member, and a plow carried by said support and arranged to cut a continuous furrow slice and discharge it directly between said pulverizing members.

7. In a plowing and pulverizing machine, a carrying frame, plowing means carried thereby and adapted to plow a furrow, scraping means at the rear of said plowing means carried by said frame and adapted to travel in the furrow made by the plowing means and disposed so as to scrape earth from the furrow and discharge it to one side thereof, and pulverizing means carried by said frame intermediate of the plowing means and said scraper, and disposed so as to receive plowed earth from the plowing means and to discharge it upon the ground after it has been pulverized.

8. In a plowing and pulverizing machine, a carrying frame, pulverizing mechanism carried thereby and adapted to discharge pulverized material upon the ground, the pulverizing mechanism being vertically adjustable, a vertically adjustable plow carried by said frame and disposed in advance of the pulverizing mechanism and being adapted to discharge plowed earth into said pulverizing material and to form a furrow, and a scraper vertically adjustable on said frame at the rear of said pulverizing mechanism and adapted to travel in said furrow and to throw material from said furrow to one side thereof.

9. In a plowing and pulverizing machine, a carrying frame, a support carried thereby, a stationary pulverizing member carried by said support, a rotary pulverizing member carried by said support and rotating with said stationary member, plowing means carried by said frame and adapted to plow a furrow and discharge the earth therefrom upon said pulverizing members, and means carried by said frame for clearing earth from said furrow at the rear of said pulverizing means and transferring it to one side of said furrow.

10. In a plowing and pulverizing machine, a carrying frame, a support vertically adjustable thereon, pulverizing means carried by said support, plowing means vertically adjustable on said frame and having means for plowing a furrow and discharging the earth therefrom into said pulverizing means, pulverizing means being adapted to discharge the pulverized earth upon the ground, and means vertically adjustable on said frame at the rear of said pulverizing means for removing material from said furrow and discharging it at one side thereof.

11. In a plowing and pulverizing machine, a carrying frame, a supplemental frame carried thereby, two pulverizing members carried by the supplemental frame, one being movable toward and from the other, yielding means for forcing the movable pulverizing member toward the other member, a plow carried by said frame and having means for plowing a furrow and discharging the plowed earth between said pulverizing members, the pulverizing members being adapted to discharge pulverized material upon the ground, and means at the rear of said support for removing material from said furrow.

12. In a plowing and pulverizing machine, a carrying frame, a pulverizing mechanism carried thereby and adapted to discharge pulverizing material upon the ground, a plow carried by said frame and having means for plowing a furrow and discharging the plowed earth into said pulverizing mechanism, and means carried by said frame and adapted to travel in said furrow at the rear of said pulverizing mechanism for removing earth from said furrow.

In testimony whereof I have signed my name to this specification in presence of two subscribing witnesses.

WILLIAM W. CURTIS.

Witnesses:
  J. C. IRWIN,
  E. B. HOUSE.